(12) United States Patent
Finkelstein et al.

(10) Patent No.: US 7,424,277 B2
(45) Date of Patent: Sep. 9, 2008

(54) DEVICE, SYSTEM AND METHOD OF WIRELESS SIGNAL DETECTION

(75) Inventors: Yuval Finkelstein, Yokneam Elite (IL); Simha Sorin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 461 days.

(21) Appl. No.: 11/210,834

(22) Filed: Aug. 25, 2005

(65) Prior Publication Data
US 2007/0049229 A1   Mar. 1, 2007

(51) Int. Cl.
*H04B 17/00* (2006.01)
(52) U.S. Cl. ............... 455/130; 455/67.11; 455/226.1; 375/142; 375/150; 375/260
(58) Field of Classification Search ..... 455/67.11–67.7, 455/226.1–226.4; 375/260, 275, 147–150
See application file for complete search history.

(56) References Cited

U.S. PATENT DOCUMENTS

| | | | |
|---|---|---|---|
| 6,771,976 B1 * | 8/2004 | Koyama | 455/502 |
| 2001/0021236 A1 * | 9/2001 | Song | 375/366 |
| 2004/0192242 A1 | 9/2004 | Dinur et al. | |
| 2005/0220175 A1 * | 10/2005 | Zhou | 375/141 |
| 2005/0220212 A1 * | 10/2005 | Marsili | 375/275 |
| 2006/0002485 A1 * | 1/2006 | Moher | 375/260 |
| 2006/0050800 A1 * | 3/2006 | Aytur et al. | 375/260 |

* cited by examiner

*Primary Examiner*—Simon D Nguyen
(74) *Attorney, Agent, or Firm*—Pearl Cohen Zedek Latzer, LLP

(57) ABSTRACT

Some embodiments of the invention provide devices, systems and methods of wireless signal detection. For example, an apparatus in accordance with an embodiment of the invention includes a detector to determine whether an incoming input is a wireless communication signal intended for reception, based on an operation applied to a cross-correlation value and an auto-correlation value.

28 Claims, 3 Drawing Sheets

DEVICE, SYSTEM AND METHOD OF WIRELESS SIGNAL DETECTION

BACKGROUND OF THE INVENTION

In the field of wireless communications, a first wireless communication station may include a receiver to detect and receive a wireless communication signal transmitted, for example, by a second wireless communication station or a wireless access point.

The receiver may include a cross-correlator to detect the wireless signal, e.g., by deriving cross-correlation coefficients from a pre-defined preamble.

Alternatively, the receiver may include an auto-correlator to detect the wireless signal, e g., by comparing a first portion of the received signal with a second, delayed portion of the received signal.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

Figure 1:
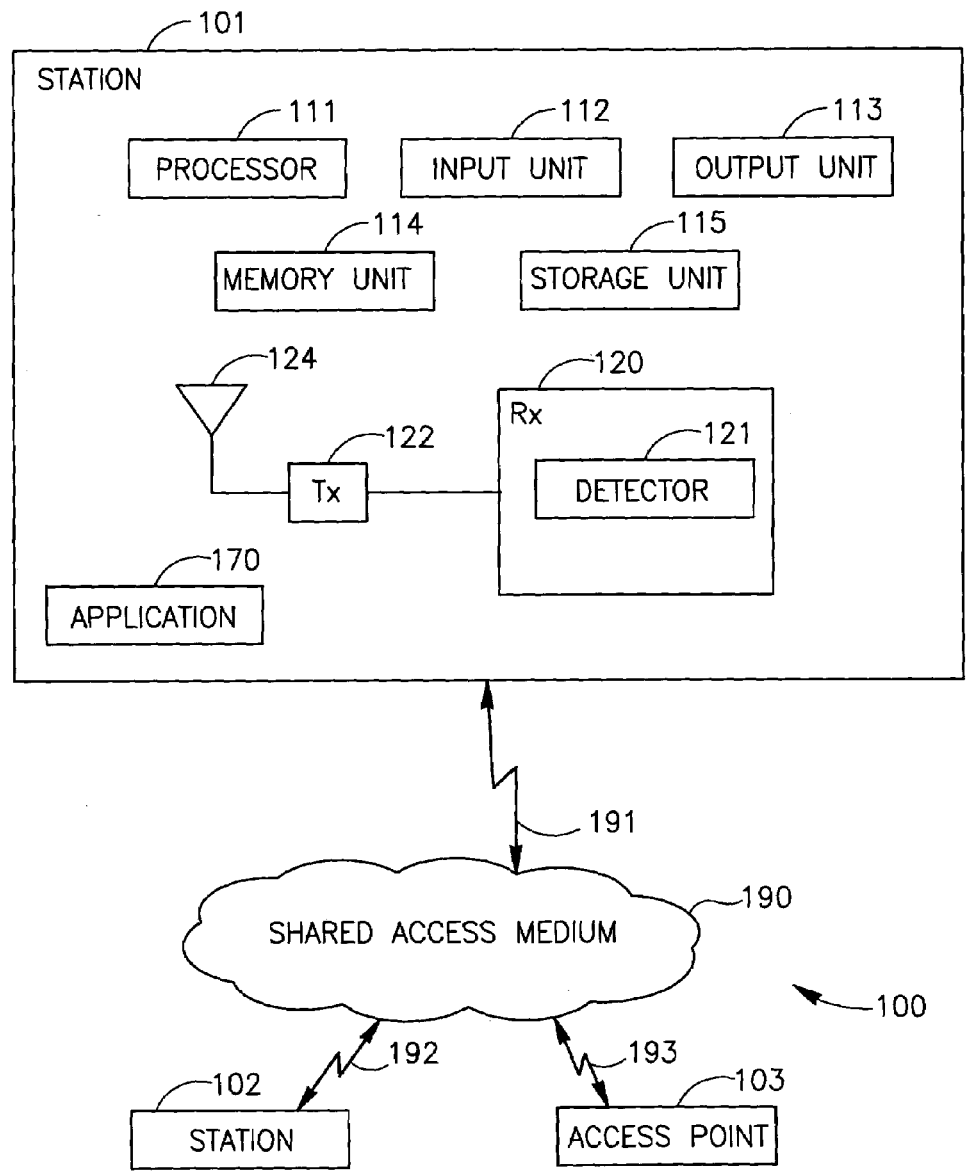
FIG. 1 is a schematic block diagram illustration of a wireless communication system including a wireless communication station able to detect a wireless communication signal in accordance with an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Embodiments of the invention may be used in a variety of applications. Some embodiments of the invention may be used in conjunction with many apparatuses and systems, for example, a transmitter, a receiver, a transceiver, a transmitter-receiver, a wireless communication station, a wireless communication device, a wireless Access Point (AP), a modem, a wireless modem, a personal computer, a desktop computer, a mobile computer,. a laptop computer, a notebook computer, a Personal Digital Assistant (PDA) device, a tablet computer, a server computer, a network, a wireless network, a Local Area Network (LAN), a Wireless LAN (WLAN), devices and/or networks operating in accordance with existing IEEE 802.11, 802.11a, 802.11b, 802.11e, 802.11g, 802.11h, 802.11i, 802.11n, 802.16 standards and/or future versions of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. It is noted that embodiments of the invention may be used in various other apparatuses, devices, systems and/or networks.

The terms "detect" and "detection" as used herein may include, for example, performing one or more detection operations, e.g., to determine whether an incoming input is a wireless communication signal intended for reception. In some embodiments, signal detection may result in, for example, a binary result, e.g., "1" or "0", "True" or "False", "Signal Detected" or "No Signal Detected", or the like, corresponding to detection or non-detection of a wireless signal intended for reception. In other embodiments, signal-detection may result in, for example, a non-binary result or value, e.g., which may be compared to a pre-defined threshold value differentiating noise from a wireless signal intended for reception. The terms "detect" and "detection" as used herein may include other suitable operations, analysis or calculations for determining whether an incoming input is a wireless communication signal intended for reception, for identifying a wireless communication signal intended for reception, for differentiating between noise and a wireless communication signal intended for reception, or the like.

FIG. 1 schematically illustrates a block diagram of a wireless communication system 100 including a wireless communication station able to detect a wireless communication signal in accordance with an embodiment of the invention. System 100 may include one or more wireless communication stations, e.g., stations 101 and 102, and one or more wireless access points, e.g., access point 103. Station 101, station 102 and access point 103 may communicate using a shared access medium 190, for example, through wireless communication links 191, 192 and 193, respectively.

Station 101 may include, for example, a processor 111, an input unit 112, an output unit 113, a memory unit 114, a storage unit 115, a receiver 120, a transmitter 122, and an antenna 124. Station 101 may further include other suitable hardware components and/or software components.

Processor 111 may include, for example, a Central Processing Unit (CPU), a Digital Signal Processor (DSP), a microprocessor, a controller, a chip, a microchip, an Integrated Circuit (IC), or any other suitable multi-purpose or specific processor or controller.

Input unit 112 may include, for example, a keyboard, a keypad, a mouse, a touch-pad, a microphone, or other suitable pointing device or input device. Output unit 113 may include, for example, a Cathode Ray Tube (CRT) monitor or display unit, a Liquid Crystal Display (LCD) monitor or display unit, a speaker, or other suitable monitor or display unit or output device.

Memory unit 114 may include, for example, a Random Access Memory (RAM), a Read Only Memory (ROM), a Dynamic RAM (DRAM), a Synchronous DRAM (SDRAM), a Flash memory, a volatile memory, a non-volatile memory, a cache memory, a buffer, a short term memory unit, a long term memory unit, or other suitable memory units or storage units. Storage unit 115 may include, for example, a hard disk drive, a floppy disk drive, a Compact Disk (CD) drive, a CD-ROM drive, or other suitable removable or non-removable storage units.

Transmitter 122 may include, for example, a wireless Radio Frequency (RF) transmitter able to transmit RF signals, e.g., through antenna 124. Receiver 120 may include, for example, a wireless RF receiver able to receive RF signals, e.g., through antenna 124.

In some embodiments, the functionality of transmitter 122 and receiver 120 may be implemented in the form of a transceiver, a transmitter-receiver, or one or more units able to perform separate or integrated functions of transmitting and/or receiving wireless communication signals, blocks, frames, transmission streams, packets, messages and/or data.

Antenna 124 may include an internal and/or external RF antenna, for example, a dipole antenna, a monopole antenna, an omni-directional antenna, an end fed antenna, a circularly polarized antenna, a micro-strip antenna, a diversity antenna, or any other type of antenna suitable for transmitting and/or receiving wireless communication signals, blocks, frames, transmission streams, packets, messages and/or data.

In some embodiments, optionally, an application 170 may be executed by one or more components of station 101, for example, by processor 111. The application 170 may include, for example, a software application, an Operating System (OS), a communications driver, or the like, and may be stored in memory unit 114 and/or storage unit 115.

In some embodiments, receiver 120 may include a detector 121 to detect incoming wireless communication signals. Detector 121 may be implemented as, for example, a sub-unit of station receiver 120, a sub-unit of processor 111, a detection controller, a detection circuit, or other hardware component and/or software component.

In accordance with some embodiments, detector 121 may detect an incoming wireless communication signal based on an auto-correlation value and a cross-correlation value, e.g., as described herein, for example, using a logical OR operation, a logical AND operation, a logical XOR operation, or other suitable logical operations. Detector 121 may, for example, determine whether an incoming input is a wireless communication signal intended for reception, based on an operation, a logical operation, a calculation, a function, or an analysis applied to a cross-correlation value and an auto-correlation value. For example, detector 121 may produce a value of "1" to indicate that a wireless signal is detected, or a value of "0" to indicate that a wireless signal is not detected. Receiver 120 may operate based on the detection result; for example, if detector 121 indicates that a signal is detected, receiver 120 may perform reception operations on the detected signal, e.g., channel estimation, frequency estimation, signal reception, or the like.

Figure 2:
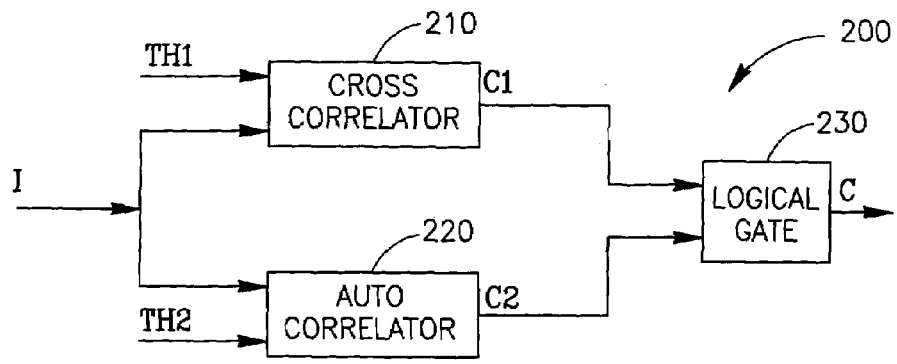
FIGS. 2-4 are schematic block diagram illustrations of detectors able to detect a wireless communication signal in accordance with some embodiments of the invention.

FIG. 2 schematically illustrates a block diagram of a detector 200 able to detect a wireless signal in accordance with an embodiment of the invention. Detector 200 may be an example of detector 121 of FIG. 1.

Detector 200 may include, for example, a cross-correlator 210 and an auto-correlator 220, whose output may be connected in parallel to a logical gate, e.g., a logical OR gate 230. An incoming input I may enter, e.g., in parallel, the cross-correlator 210 and the auto-correlator 220.

Cross-correlator 210 may perform cross-correlation of the input I, for example, in relation to a threshold value TH1. The threshold value TH1 may be, for example, adaptive, and may indicate a minimum cross-correlation value for which detection of a signal may be determined. The output of the cross-correlator 210, denoted C1, may be, for example, a value of "1" indicating that a signal is detected, or a value of "0" indicating that no signal is detected.

Auto-correlator 220 may perform auto-correlation of the input I, for example, in relation to a threshold value TH2. The threshold value TH2 may be, for example, adaptive, and may indicate a minimum auto-correlation value for which detection of a signal may be determined. The output of the auto-correlator 220, denoted C2, may be, for example, a value of "1" indicating that a signal is detected, or a value of "0" indicating that no signal is detected.

The cross-correlation output C1 and the auto-correlation output C2 may enter the logical gate 230, which may perform, for example, a logical OR operation to produce a correlation result, denoted C. For example, if C1 is equal to "1", or if C2 is equal to "1", or if both C1 and C2 are equal to "1", then C may be equal to "1". Conversely, if both C1 and C2 are equal to "0", then C may be equal to "0". Other suitable logical gates may be used, for example, a logical XOR gate, a logical AND gate, or the like.

It is noted that threshold value TH1 may be different from threshold value TH2, and that threshold values TH1 and TH2 may be pre-defined in specific implementations, e.g., to achieve a certain detection sensitivity and/or to avoid or reduce incorrect positive detection results ("false alarms") above a certain rate.

Figure 3:
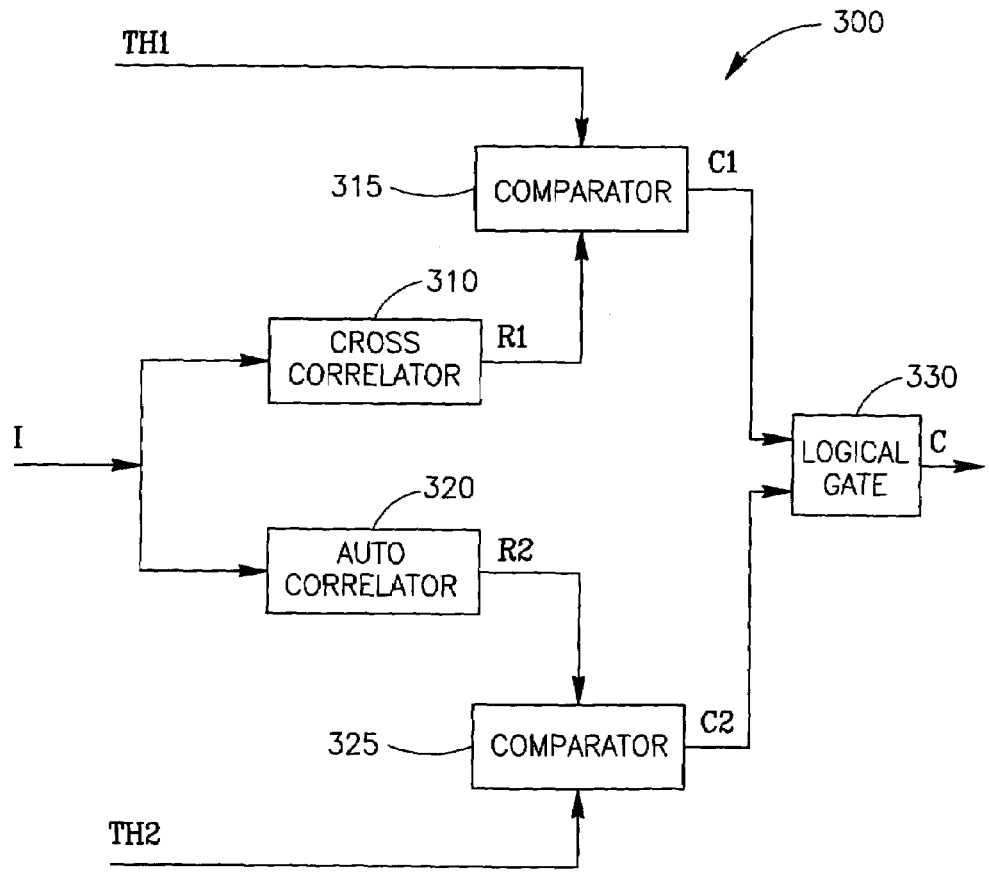

FIG. 3 schematically illustrates a block diagram of a detector 300 able to detect a wireless signal in accordance with another embodiment of the invention. Detector 300 may be an example of detector 121 of FIG. 1.

Detector 300 may include, for example, a cross-correlator 310, an auto-correlator 320, two comparators 315 and 325, and a logical gate, e.g., a logical OR gate 330. An incoming input I may enter, e.g., in parallel, the cross-correlator 310 and the auto-correlator 320.

Cross-correlator 310 may perform cross-correlation of the input I, and may produce a value of a cross-correlation result R1. Comparator 315 may compare the value of the cross-correlation result R1 and a threshold value TH1. The threshold value TH1 may be, for example, adaptive, and may indicate a minimum cross-correlation value for which detection of a signal may be determined. The output of comparator 315, denoted C1, may be, for example, a value of "1" indicating that a signal is detected, e.g., if the value of the cross-correlation result R1 is equal to or bigger than the threshold value TH1. Conversely, the output C1 of comparator 315 may be, for example, a value of "0" indicating that no signal is detected, e.g., if the value of the cross-correlation result R1 is smaller than the threshold value TH1.

Auto-correlator 320 may perform auto-correlation of the input I, and may produce a value of an auto-correlation result R2. Comparator 325 may compare the value of the auto-correlation result R2 and a threshold value TH2. The threshold value TH2 may be, for example, adaptive, and may indicate a minimum auto-correlation value for which detection of a signal may be determined. The output of the comparator 325, denoted C2, may be, for example, a value of "1" indicating that a signal is detected, e.g., if the value of the auto-correlation result R2 is equal to or bigger than the threshold value TH2. Conversely, the output of the comparator C2 may be, for example, a value of "0" indicating that no signal is detected, e.g., if the value of the auto-correlation result R2 is smaller than the threshold value TH2.

The output C1 of comparator 315 and the output C2 of comparator 325 may enter the gate 330, which may perform, for example, a logical OR operation to produce a correlation result, denoted C. For example, if C1 is equal to "1", or if C2 is equal to "1", or if both C1 and C2 are equal to "1", then C may be equal to "1". Conversely, if both C1 and C2 are equal to "0", then C may be equal to "0". Other suitable logical gates may be used, for example, a logical XOR gate, a logical AND gate, or the like.

It is noted that threshold value TH1 may be different from threshold value TH2, and that threshold values TH1 and TH2 may be pre-defined in specific implementations, e.g., to achieve a certain detection sensitivity and/or to avoid or reduce incorrect positive detection results ("false alarms") above a certain rate.

Figure 4:
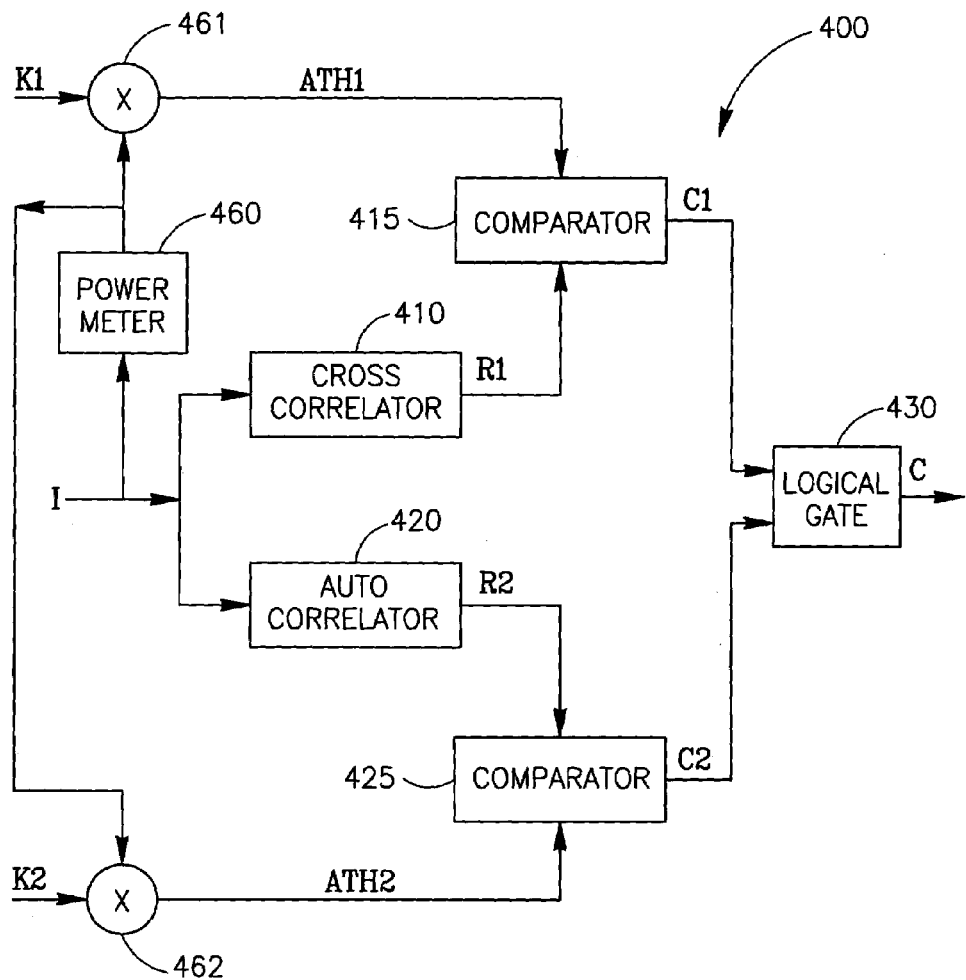

FIG. 4 schematically illustrates a block diagram of a detector 400 able to detect a wireless signal in accordance with yet another embodiment of the invention. Detector 400 may be an example of detector 121 of FIG. 1.

Detector 400 may include, for example, a cross-correlator 410, an auto-correlator 420, two comparators 415 and 425, a logical gate, e.g., a logical OR gate 430, two scalers 461 and 462, and a power meter 460. An incoming input I may enter, e.g., in parallel, the cross-correlator 410 and the auto-correlator 420.

Cross-correlator 410 may perform cross-correlation of the input I, and may produce a value of cross-correlation result R1. Comparator 415 may compare the value of the cross-correlation result R1 and an adaptive threshold value ATH1. The adaptive threshold value ATH1 may, for example, indicate a minimum cross-correlation value for which detection of a signal may be determined. The adaptive threshold value ATH1 may be produced, for example, by passing the input I through power meter 460, and multiplying the output of power meter 460 by a constant K1, e.g., using scaler 461. The output of comparator 415, denoted C1, may be, for example, a value of "1" indicating that a signal is detected, e.g., if the value of the cross-correlation result R1 is equal to or bigger than the adaptive threshold value ATH1. Conversely, the output C1 of comparator 415 may be, for example, a value of "0" indicating that no signal is detected, e.g., if the value of the cross-correlation result R1 is smaller than the adaptive threshold value ATH1.

Auto-correlator 420 may perform auto-correlation of the input I, and may produce a value of an auto-correlation result R2. Comparator 425 may compare the value of the auto-correlation result R2 and an adaptive threshold value ATH2. The adaptive threshold value ATH2 may, for example, indicate a minimum auto-correlation value for which detection of a signal may be determined. The adaptive threshold value ATH2 may be produced, for example, by passing the input I through power meter 460, and multiplying the output of power meter 460 by a constant K2 e.g., using scaler 462. The output of the comparator 425, denoted C2, may be, for example, a value of "1" indicating that a signal is detected, e.g., if the value of the auto-correlation result R2 is equal to or bigger than the adaptive threshold value ATH2. Conversely, the output C2 of comparator 425 may be, for example, a value of "0" indicating that no signal is detected, e.g., if the value of the auto-correlation result R2 is smaller than the adaptive threshold value ATH2.

The output C1 of the comparator 415 and the output C2 of comparator 425 may enter the gate 430, which may perform, for example, a logical OR operation to produce a correlation result, denoted C. For example, if C1 is equal to "1", or if C2 is equal to "1", or if both C1 and C2 are equal to "1", then C may be equal to "1". Conversely, if both C1 and C2 are equal to "0", then C may be equal to "0". Other suitable logical gates may be used, for example, a logical XOR gate, a logical AND gate, or the like.

It is noted that constant K1 may be different from constant K2, that adaptive threshold value ATH1 may be different from adaptive threshold value ATH2, and that adaptive threshold values TH1 and TH2 may be predefined in specific implementations, e.g., to achieve a certain detection sensitivity and/or to avoid or reduce incorrect positive detection results ("false alarms") above a certain rate.

Although logical OR gates 230, 330 and 430 may be used in FIGS. 2, 3 and 4, respectively, embodiments of the invention are not limited in this regard, and may include, for example, OR circuitry, OR logic, or other suitable gates or logical operations, e.g., an AND gate, an eXclusive OR (XOR) gate, or the like. For example, in some embodiments, an AND gate may be used, e.g., to avoid or reduce incorrect positive detection results ("false alarms").

Although FIGS. 2, 3 and 4 show various detectors or detection circuits including a cross-correlator and an auto-correlator, other suitable combinations of components may be used. For example, in some embodiments, a detector or detection circuit may be operatively associated with a cross-correlator unit and/or an auto-correlator unit, which may be separate units from the detector, may not be included in the detector, or may provide an auto-correlation value and a cross-correlation value to the detector.

Figure 5:
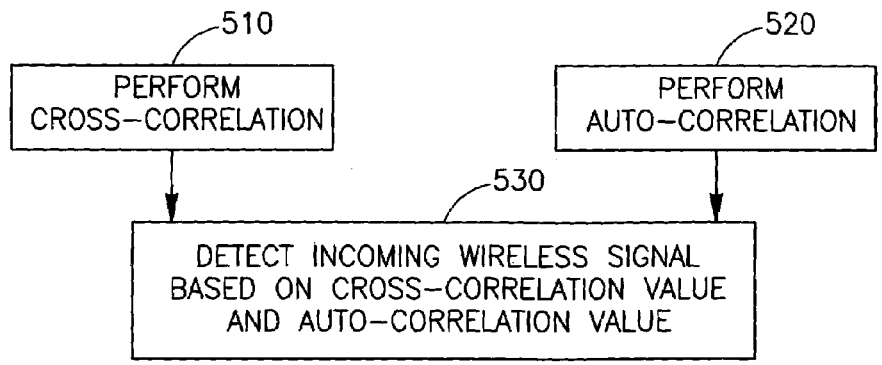
FIG. 5 is a schematic flow-chart of a method of wireless signal detection in accordance with an embodiment of the invention.

FIG. 5 is a schematic flow-chart of a method of wireless signal detection in accordance with an embodiment of the invention. Operations of the method may be implemented, for example, by system 100 of FIG. 1, by station 101 of FIG. 1, by processor 111 of FIG. 1, by detector 121 of FIG. 1, by detector 200 of FIG. 2, by detector 300 of FIG. 3, by detector 400 of FIG. 4, and/or by other suitable stations, access points, detectors, receivers, controllers, processors, units, devices, and/or systems.

As indicated at box 510, the method may optionally include, for example, performing cross-correlation on an incoming input. In some embodiments, the cross-correlation may be performed in relation to a threshold value, and may optionally include comparing a cross-correlation value to the threshold value. In some embodiments, for example, a cross-correlation value or a cross-correlation result may be generated.

As indicated at box 520, the method may optionally include, for example, performing auto-correlation on the incoming input. In some embodiments, the auto-correlation may be performed in relation to a threshold value, and may optionally include comparing an auto-correlation value to the threshold value. In some embodiments, for example, a cross-correlation value or an auto-correlation result may be generated.

In one embodiment, for example, the operations of boxes 510 and 520 may be performed substantially in parallel or substantially simultaneously.

As indicated at box 530, the method may optionally include, for example, detecting an incoming signal based on the cross-correlation value and the auto-correlation value. This may include, for example, performing a logical operation, e.g., a logical OR operation, a logical AND operation, a logical XOR operation, or other one or more suitable operations, on the cross-correlation value and the auto-correlation value, to result in a detection result. For example, the method may include determining whether an incoming input is a wireless communication signal intended for reception, based on an operation, a logical operation, a calculation, a function, or an analysis applied to a cross-correlation value and an auto-correlation value. For example, in one embodiment, if the cross-correlation output is that a wireless signal is detected, or if the auto-correlation output is that a wireless signal is detected, or if both the cross-correlation output and the auto-correlation output are that a wireless signal is detected, then it may be determined that a wireless signal is detected. Conversely, if both the cross-correlation output and the auto-correlation output are that a wireless signal is not detected, then it may be determined that a wireless signal is not detected.

Other suitable operations or sets of operations may be used in accordance with embodiments of the invention.

Although portions of the discussion herein may relate, for exemplary purposes, to a value of "1" indicating a positive correlation result or a positive detection result, and to a value of "0" indicating a negative correlation result or a negative detection result, embodiments of the invention are not limited in this regard. For example, in some embodiments, a value of "1" may indicate a negative correlation result or a negative detection result, and a value of "0" may indicate a positive correlation result or a positive detection result. In some embodiments, other suitable values or indication may be used, for example, "True"/"False", or the like. In some embodiments, the output of the autocorrelator and/or the output of the cross-correlator may be normalized, non-normalized, adaptive, divided by a pre-defined maximum value, divided by an energy level or a maximum energy level, or otherwise processed.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by system 100 of FIG. 1, by station 101 of FIG. 1, by processor 111 of FIG. 1, by detector 121 of FIG. 1, by detector 200 of FIG. 2, by detector 300 of FIG. 3, by detector 400 of FIG. 4, or by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit (e.g., memory unit 114 or storage unit 115), memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-R-W), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/ or interpreted programming language, e.g., C, C++, Java, BASIC, Pascal, Fortran, Cobol, assembly language, machine code, or the like.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
    a cross-correlator to generate a cross-correlation value by performing cross-correlation of an input communication signal in relation to a first threshold value;
    an auto-correlator to generate an auto-correlation value by performing auto-correlation of the input communication signal in relation to a second threshold value;
    a logical gate to apply an operation on the cross-correlation value and the auto-correlation value to result in a detection result,
    wherein the apparatus is to determine whether the input communication signal is a wireless communication signal intended for reception, based on the detection result.

2. The apparatus of claim 1, wherein the cross-correlator is to detect said communication signal using cross-correlation; and
    the auto-correlator is to detect said communication signal using auto-correlation.

3. The apparatus of claim 1, wherein said operation comprises a logical operation.

4. The apparatus of claim 1, wherein said operation comprises a logical OR operation.

5. The apparatus of claim 1, further comprising:
    a first comparator to generate the cross-correlation value by comparing a cross-correlation result to the first threshold value; and
    a second comparator to generate the auto-correlation value by comparing an auto-correlation result to the second threshold value.

6. The apparatus of claim 5, wherein said cross-correlation value is a normalized cross-correlation value, and wherein said auto-correlation value is a normalized auto-correlation value.

7. The apparatus of claim 1, wherein said first and second threshold values are adaptive values.

8. The apparatus of claim 1, further comprising:
    a power meter to generate a power value associated with said input communication signal;
    a first scaler to multiply said power value by a first constant to produce said first threshold value; and
    a second scaler to multiply said power value by a second constant to produce said second threshold value.

9. The apparatus of claim 1, further comprising:
    a wireless receiver to receive said input communication signal.

10. A wireless communication station comprising:
    the apparatus of claim 9; and
    a wireless antenna to send and receive wireless communication signals.

11. A wireless communication system comprising:
    a wireless communication station including:
        a cross-correlator to generate a cross-correlation value by performing cross-correlation of an input communication signal in relation to a first threshold value;
        an auto-correlator to generate an auto-correlation value by performing auto-correlation of the input communication signal in relation to a second threshold value;

a logical gate to apply an operation on the cross-correlation value and the auto-correlation value to result in a detection result,
wherein the wireless communication station is to determine whether the input communication signal is a wireless communication signal intended for reception, based on the detection result.

12. The wireless communication system of claim 11, wherein
the cross-correlator is to detect said communication signal using cross-correlation; and
the auto-correlator is to detect said communication signal using auto-correlation.

13. The wireless communication system of claim 11, wherein said operation comprises a logical operation.

14. The wireless communication system of claim 11, wherein said operation comprises a logical OR operation.

15. The wireless communication system of claim 11, wherein said wireless communication station further comprises:
a first comparator to generate the cross-correlation value by comparing a cross-correlation result to the first threshold value; and
a second comparator to generate the auto-correlation value by comparing an auto-correlation result to the second threshold value.

16. The wireless communication system of claim 15, wherein said cross-correlation value is a normalized cross-correlation value, and wherein said auto-correlation value is a normalized auto-correlation value.

17. The wireless communication system of claim 11, wherein said first and second threshold values are adaptive values.

18. The wireless communication system of claim 11, wherein said wireless communication station further comprises:
a power meter to generate a power value associated with said communication signal;
a first scaler to multiply said power value by a first constant to produce said first threshold value; and
a second scaler to multiply said power value by a second constant to produce said second threshold value.

19. A method comprising:
generating a cross-correlation value by performing cross-correlation of an input communication signal in relation to a first threshold value;
generating an auto-correlation value by performing auto-correlation of the input communication signal in relation to a second threshold value;
applying an operation on the cross-correlation value and the auto-correlation value to result in a detection result; and
determining whether the input communication signal is a wireless communication signal intended for reception, based on the detection result.

20. The method of claim 19, comprising:
detecting said communication signal using cross-correlation; and
detecting said communication signal using auto-correlation.

21. The method of claim 19, wherein applying the operation comprises applying a logical operation.

22. The method of claim 19, wherein applying the operation comprises applying a logical OR operation.

23. The method of claim 19, wherein generating the cross-correlation value comprises comparing a cross-correlation result to the first threshold value and generating the auto-correlation value comprises comparing a auto-correlation result to the second threshold value.

24. The method of claim 19, further comprising:
generating a power value associated with said input communication signal;
multiplying said power value by a first constant to produce said first threshold value; and
multiplying said power value by a second constant to produce said second threshold value.

25. The method of claim 19, further comprising:
receiving said input communication signal.

26. A wireless communication station comprising:
a cross-correlator to generate a cross-correlation value by performing cross-correlation of an input communication signal in relation to a first threshold value;
an auto-correlator to generate an auto-correlation value by performing auto-correlation of the input communication signal in relation to a second threshold value;
a logical gate to apply an operation on the cross-correlation value and the auto-correlation value to result in a detection result, wherein the wireless communication station is to determine whether the input communication signal is a wireless communication signal intended for reception, based on the detection result; and
a dipole antenna to receive said wireless communication signal.

27. The wireless communication station of claim 26,
the cross-correlator is to detect said communication signal using cross-correlation; and
the auto-correlator is to detect said communication signal using auto-correlation.

28. The wireless communication station of claim 26, wherein said operation comprises a logical operation.

* * * * *